(12) United States Patent
Jung et al.

(10) Patent No.: US 8,025,238 B2
(45) Date of Patent: Sep. 27, 2011

(54) TIRE BUILT IN RFID TAG

(75) Inventors: Hong Chae Jung, Incheon (KR); Sang Kug Moon, Seoul (KR); Jong Sup Yun, Hwaseong-si (KR); Jong Hwan Yoon, Suwon-si (KR); Ho Jeong Ko, Gwangmyueong-si (KR); Jeong Geol Seo, Osan-si (KR); Dong Uk Lim, Seoul (KR); Nam Hoon Kim, Goyang-si (KR); Sung Chul Kim, Seoul (KR)

(73) Assignee: Asiana IDT Inc., Jongno-Gu, Seoul (KR)

( * ) Notice: Subject to any disclaimer, the term of this patent is extended or adjusted under 35 U.S.C. 154(b) by 227 days.

(21) Appl. No.: 12/530,870

(22) PCT Filed: Mar. 4, 2008

(86) PCT No.: PCT/KR2008/001235
§ 371 (c)(1),
(2), (4) Date: Oct. 1, 2009

(87) PCT Pub. No.: WO2008/111753
PCT Pub. Date: Sep. 18, 2008

(65) Prior Publication Data
US 2010/0090013 A1   Apr. 15, 2010

(30) Foreign Application Priority Data
Mar. 13, 2007   (KR) .................. 10-2007-0024304

(51) Int. Cl.
*G06K 19/06*   (2006.01)

(52) U.S. Cl. ...................................... 235/492; 152/152.1
(58) Field of Classification Search .................. 235/492, 235/375, 487; 152/152.1
See application file for complete search history.

(56) References Cited

U.S. PATENT DOCUMENTS

| 6,581,657 | B1 * | 6/2003 | Brown ................ 152/152.1 |
| 7,690,578 | B2 * | 4/2010 | Kawai ................ 235/492 |
| 2002/0116992 | A1 * | 8/2002 | Rickel ................ 73/146 |
| 2005/0010106 | A1 | 1/2005 | Lang |

FOREIGN PATENT DOCUMENTS

| JP | 2005-346675 | 12/2005 |
| KR | 1020060119635 | 11/2006 |

* cited by examiner

*Primary Examiner* — Edwyn Labaze
(74) *Attorney, Agent, or Firm* — Lexyoume IP Group, PLLC.

(57) ABSTRACT

Disclosed herein is a built-in RFID tire tag. The built-in RFID tire tag includes an antenna and a circuit unit. The antenna is mounted in a tire, and is configured to be operated by resonating with radio waves, which are transmitted from an RFID reader and to have a repetitive corrugated shape. The circuit unit is configured to be operated by being supplied with power using the radio waves. The antenna includes a pair of tag radiators. Each of the tag radiators is divided into a first region and a second region. The corrugation density of the second regions, which are close to the circuit unit, is greater than that of the first regions, which are not close to the circuit unit. The first regions, which depend on rotational motion of the tire, adapt flexibly to bending and torsion of the tire by the difference between the corrugation densities.

11 Claims, 9 Drawing Sheets

TIRE BUILT IN RFID TAG

TECHNICAL FIELD

The present invention relates to a built-in RFID tire tag and, more particularly, to a built-in RFID tire tag, which is mounted in a tire during a tire manufacturing process, or after the tire manufacturing process, thus not only realizing secure fastening to the tire but also improving the identification rate of an RFID reader.

BACKGROUND ART

Generally, a Radio Frequency Identification (RFID) system is a non-contact identification system that enables a small-sized chip to be attached to various articles and transmits and processes information about the articles using radio frequencies, and includes a tag, which is provided with a chip and an antenna, and a reader, which reads information about articles stored in the chip.

Generally, such an RFID tag is attached to the surface of a commodity or is inserted into an article. The success rate of detection (identification rate) varies according to the angle formed between the RFID tag and an RFID reader, which is used to detect RFID tags. When the RFID reader is oriented perpendicular to the plane of the RFID tag, the success rate of detection by the RFID tag is highest. In contrast, when the RFID reader is oriented parallel to the plane of the RFID tag, the success rate of detection of the RFID tag is lowest. Accordingly, in order to increase the success rate of detection of the RFID tag, an attempt to manufacture a three-dimensional RFID tag has been made. However, there are problems in that the three-dimensional RFID tag cannot be mounted to some articles, and in that the cost of the RFID tag itself is increased.

Furthermore, when tires are manufactured, in order to perform production management using the LOT numbers of respective tires, or for application in an ERP system for inventory management, such tags may be attached to or mounted in respective tires in a tire forming process. In this case, the quality of the tags may be lowered due to damage under the severe manufacturing conditions of a vulcanization process, which is a process that is performed after the tire forming process, that is, at a temperature between 200° C.~250° C. and at a pressure of more than 30 Bar, and thus the tags may not perform their functions.

Furthermore, due to the rotational motion of a tire, a tag, which is mounted in the tire, may be moved from its original position, or may be deformed.

In addition, due to the rotational motion of a tire, a tag which is mounted in the tire may be damaged.

Accordingly, the present applicant intends to propose an RFID tire tag, in which the antenna of the tag is formed to have a corrugated shape through a plate etching process, a press molding process, or a extrusion molding process, and is then mounted in a tire, thus minimizing deformation and damage attributable to rotational motion of the tire and increasing mechanical reliability and identification success.

DISCLOSURE

Technical Problem

Accordingly, an object of the present invention is to provide a built-in RFID tire tag, which is mounted in a tire, and is formed such that each of the bonding regions of a circuit unit and an antenna have a corrugated shape, so that, when rotational motion of the tire occurs, the tag, having elasticity in the rotating tire, becomes mechanically secured and reliable. This corrugated shape may be a triangular wave shape or a circular wave shape, and the antenna may be processed to have a leaf spring structure, a wire spring structure or an elastic spring structure.

Furthermore, another object of the present invention is to provide a built-in RFID tire tag, which can realize impedance matching between the circuit unit and the antenna of the tag using the corrugated shape of the antenna.

Furthermore, another object of the present invention is to provide a built-in RFID tire tag, which is configured such that holes are formed in the antenna, constituting the tire tag, and enables rubber material constituting a tire to be inserted into the holes and coupled thereto when a vulcanization process is performed on the tire, thus enabling the tire tag to be securely coupled to the tire.

Furthermore, another object of the present invention is to provide a built-in RFID tire tag, which is mounted in a tire during (or after) a tire manufacturing process, that is, a forming process, thus enabling universal and efficient lot production, inventory and distribution management for tires.

Furthermore, another object of the present invention is to provide an RFID tire tag, in which the antenna of the tag is formed to have a corrugated shape (a triangular wave shape or a circular wave shape) through a plate etching process, a press molding process, or a extrusion molding process, and is then mounted to a tire, thus increasing mechanical reliability and identification success not only by minimizing elastic impacts to the tag, attributable to the rotational motion of the tire, using the elasticity of the corrugated antenna, but also by minimizing deformation and damage attributable to the rotational motion of the tire.

Technical Solution

In order to accomplish the above objects, the present invention provides a built-in RFID tire tag, including: an antenna mounted in a tire, and configured to be operated by resonating with radio waves, which are transmitted from an RFID reader and to have a repetitive corrugated shape; and a circuit unit configured to be operated by being supplied with power using the radio waves; wherein the antenna comprises a pair of tag radiators, which are arranged on the basis of the circuit unit, each of the tag radiators being divided into a first region and a second region, the corrugation density of the second regions, which are close to the circuit unit, is greater than that of the first regions, which are not close to the circuit unit, and the first regions, which depend on rotational motion of the tire, adapt flexibly to bending and torsion of the tire by the difference between the corrugation densities.

It is preferred that each of the tag radiators be any of a triangular wave-shaped leaf spring tag, a triangular wave-shaped wire spring tag, circular wave-shaped leaf spring tag, and a circular wave-shaped wire spring tag.

It is preferred that the tag radiators be formed through any of a plate etching process, a press molding process, and an extrusion molding process.

It is preferred that the triangular wave-shaped wire spring tag and the circular wave-shaped wire spring tag have a length of less than 60 mm and a wire diameter of 0.1 mm~0.5 mm, and operate in a frequency band of more than 13 MHz.

It is preferred that the triangular wave-shaped leaf spring tag and the circular wave-shaped leaf spring tag have a length of less than 60 mm and have a board thickness of 0.1 mm~0.45 mm, and operate in a frequency band of more than 13 MHz.

It is preferred that each of the triangular wave-shaped leaf spring tag and the circular wave-shaped leaf spring tag include one or more holes, and the holes enable material, which is used to form the tire, to be inserted thereinto and coupled thereto when a forming process or a vulcanization process is performed on the tire.

It is preferred that the corrugated shape generate inductive reactance using the corrugation densities, the inductive reactance realizing impedance matching between the antenna and the circuit unit by decreasing the capacitive reactance of the circuit unit.

The triangular wave-shaped leaf spring tags, the triangular wave-shaped wire spring tags, the circular wave-shaped leaf spring tags, and the circular wave-shaped wire spring tags may be configured such that the ends of the respective tag radiators, which are arranged on the basis of the circuit unit, are connected to form a closed loop.

It is preferred that the circuit unit include insertion holes, which are formed in respective ends of the circuit unit, and that the ends of the second regions be inserted into the respective holes and be bent inwards to be soldered to the rear surface of the circuit unit.

The RFID tire tag may be mounted in any of a shoulder and apex of the tire, or between a sidewall and inner liner of the tire.

The corrugation density of the first regions and the corrugation density of the second regions may be identical to each other.

Advantageous Effects

In the present invention, a pair of tag radiators, which constitute the antenna of an RFID tire tag, are three-dimensionally implemented, so that the area facing a transponder and wings is increased, and thus the RFID tire tag identification rate of the transponder can be increased. Furthermore, in the present invention, the tag radiators are three-dimensionally arranged, are implemented to have a triangular wave or a circular wave shape, and are inserted into a tire in a vulcanization process of melting and processing tires, during a tire forming process, or after the tire forming process, so that the tire and the RFID tire tag can be securely coupled to each other when the tire is finally produced.

Furthermore, each of the radiators of the tire tag is divided into two region, that is, a first region and a second region (refer to the detailed description) depending on the location relative to the circuit unit, and the respective regions have different corrugation densities, so that impedance matching between the transponder and the antenna can be easily realized. In an embodiment of the present invention, the repetition period of the corrugation density of the second regions is set to be greater than that of the corrugation density of the first regions, so that the tag radiators of the second regions coarsely reduce the capacitive reactance of the circuit unit, and the tag radiators of the first regions finely reduce the capacitive reactance of the circuit unit.

DESCRIPTION OF REFERENCE NUMERALS OF PRINCIPAL ELEMENTS

101~110, 113, 115~117, 120~123, 125~128, 131, 132, 135, 136, 140~146: tag radiators
105a, 111: boards
122a, 122b, 122c, 125a, 125b, 125c, 137: holes
138, 119: boards
139: a region in which ends of tag radiators are connected
111a, 111b: hole
118, 122, 124, 130: ends of tag radiators
129, 133: conductive panel

MODE FOR INVENTION

The present invention is described in detail with reference to the accompanying drawings below.

Figure 1:
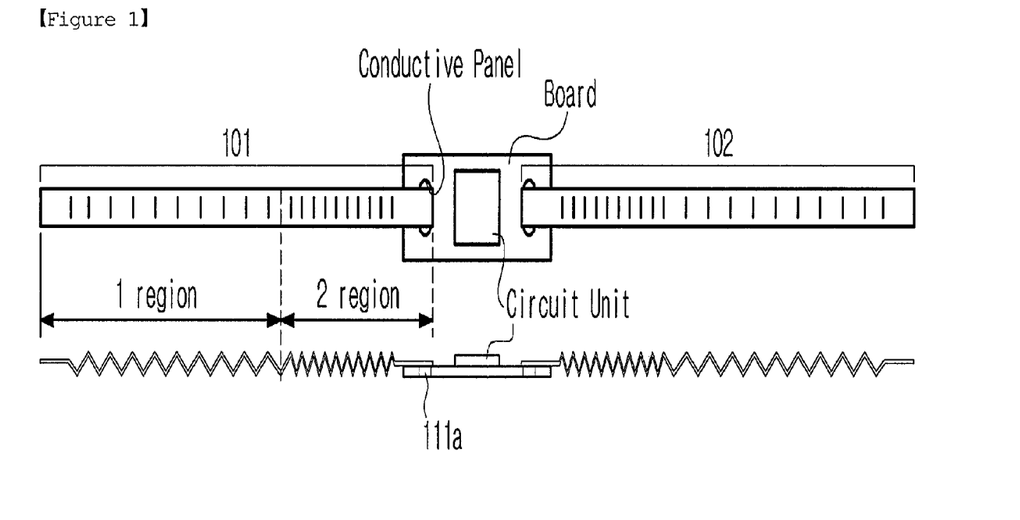
FIG. 1 is a view showing an embodiment of an RFID tire tag, in which tag radiators are implemented to have a triangular wave shape on respective boards.

FIG. 1 shows an RFID tire tag according to an embodiment of the present invention.

The RFID tire tag, shown in the drawing, includes a circuit unit, and a pair of tag radiators 101 and 102, which are configured to resonate with radio waves that are transmitted from an external transponder (not shown). The circuit unit includes a circuit chip (not shown) for storing information about physical properties, such as the pneumatic pressure and temperature of a tire, and is coupled to a conductive panel through soldering.

When the external transponder (not shown) requests the information about the physical properties of a tire from the RFID tag, the circuit unit uses radio waves, which are provided by the external transponder, as a power source, and transmits the information, which is stored in the circuit unit, to the transponder through the tag radiators 101 and 102. Accordingly, the circuit unit includes a feed circuit for rectifying radio waves, which are received through an antenna, which is provided with the tag radiators 101 and 102, and using the rectified radio waves as a power source.

Each of the tag radiators is formed to have a dipole structure, and to have a length of $\lambda/2$ at the frequency of the radio waves, which are transmitted from the transponder. Accordingly, the tag radiators 101 and 102 have a length of $\lambda/4$, and are structurally symmetrical with respect to the circuit unit.

The tag radiators 101 and 102, shown in the drawing, are formed by performing a bending process, a plate etching process, a press molding process or an extrusion molding process on metal wires. The method of forming the tag radiators applies to all of the other embodiments, which will be described later, as well as to the present embodiment.

In the drawing, each of the tag radiators 101 and 102, which constitute the antenna, has a corrugated shape. A region closer to the circuit unit has a relatively high corrugation repetition period. Accordingly, a first region, which is far from the circuit unit, is curved in the rotation direction of a circular tire when the tire is rotated, and the second region, which is close to the circuit unit, protects the mechanically weakest circuit unit. Each of the tag radiators 101 and 102 has a corrugated shape and thus fundamentally has elasticity, and is implemented using a wire or a narrow board. In the drawing, tag radiators 101 and 102 using wires are shown. In the case where the tag radiators 101 and 102 are implemented using the narrow boards, there is an advantage in that the deformation of the tag radiators 101 and 102, attributable to a force that is applied by the rotation or torsion of the tire, can be minimized, however, the responsiveness to a request from the external transponder is reduced. In order to solve this problem, the tag radiators 101 and 102 are formed to have a triangular wave shape, thus maximizing the contact area with the external transponder. In this case, the total length of the corrugated tag radiators 101 and 102 is determined according to the frequency of communication with the external transponder. In the case where the frequency of communication with the external transponder is 13 MHz, the length of the corrugated tag radiator (for example, reference numeral 101) must not exceed 60 mm because the antenna according to the present embodiment is a dipole antenna. Meanwhile, tag radiators 101 and 102 and the circuit unit are coupled to each other by soldering, and the second regions are coupled to the circuit unit in the direction of the plane of the board of the circuit unit. Although not shown clearly in the drawing, the circuit unit and the tag radiator 101 are electrically connected to each other. Furthermore, the circuit unit and the tag radiator 101 may be connected using a separate circuit wire, or may be electrically connected by soldering both the second region of the tag radiator 101 and the circuit unit.

Thanks to the above-described structure, the lengths of the tag radiators 101 and 102 can be decreased. When the RFID tire tag is inserted into a tire during a tire forming process, or after the tire forming process has been completed, and then the tire is vulcanized, the tag radiators 101 and 102, having a triangular wave shape, may be coupled with the rubber material of the tire in a manner similar to that of a toothed wheel.

In the drawing, the tag radiators 101 and 102 have inductive reactance thanks to the corrugated shape. The circuit unit realizes impedance matching by decreasing capacitive reactance using the inductive reactance. Here, the repetition period in the second regions is larger than that in the first regions, so that the tag radiators in the second regions coarsely decreases the capacitive reactance of the circuit unit, but the tag radiators in the first regions finely decrease the capacitive reactance of the circuit unit. In this case, it is preferred that the tag radiators in the first regions and the tag radiators in the second regions be formed using boards having a thickness of 0.1 mm~0.45 mm, and that they be made of phosphor bronze, which is an alloy of phosphor and bronze. Phosphor bronze is a material having excellent elasticity and flexibility, so that, when the tag radiators are formed using the phosphor bronze, having a thickness of 0.1 mm~0.45 mm, the tag radiators are not broken in a tire and are sufficiently bent in the direction in which the tire rotates. In the case where the tag radiators 101 and 102 are formed using wires, it is preferred that each of the tag radiators 101 and 102 have a diameter of 0.1 mm~0.5 mm. In order to enable all of the boards and the wires to operate in a frequency band of more than 13 MHz, it is preferred that each of the tag radiators 101 and 102 have a length of less than 60 mm. The thickness of the boards, the diameter of the wires, and the frequency characteristic, described above, are applied to all embodiments, which will be described later, and repeated descriptions are omitted.

Meanwhile, when a tire is rotated, the part that is the least resistant to the motion of the tire is the circuit unit, which is almost completely inflexible. In the case where the tag radiators in the first regions are connected to the circuit unit unchanged, an excessive difference in elasticity occurs between the first regions and the circuit unit, so that there is a risk of damage to the RFID tire tag when the tire is rotated. Accordingly, the second regions, which have higher elasticity than the circuit unit and the first regions, are located between the first regions and the circuit unit, so that the circuit unit and the first regions can be flexibly connected to each other.

Figure 2:
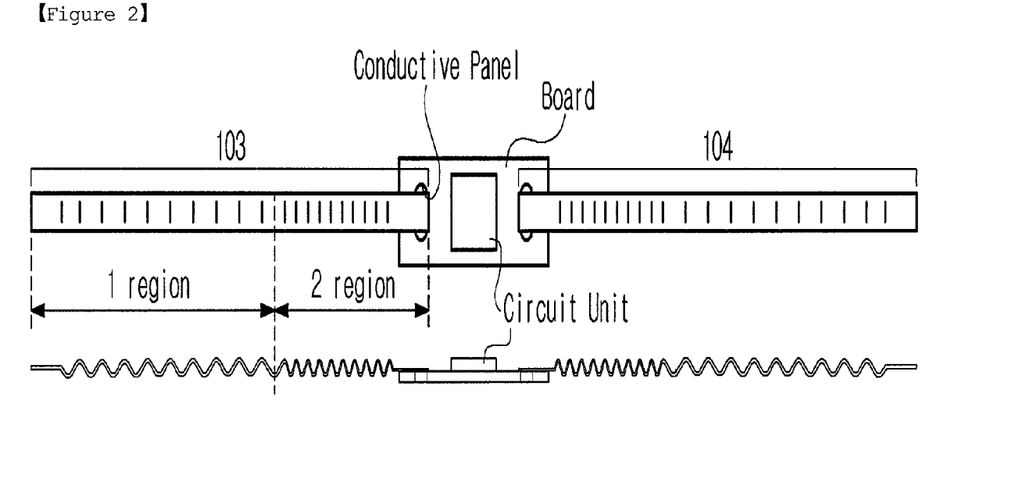
FIG. 2 is a view showing another embodiment of an RFID tire tag, in which tag radiators are implemented to have a circular wave shape on respective boards.

FIG. 2 shows an RFID tire tag according to another embodiment of the present invention.

The RFID tire tag shown in FIG. 2 is similar to that shown in FIG. 1, but differs from that shown in FIG. 1 in that the tag radiators 103 and 104 have a circular wave shape. When the tag radiators 103 and 104 are formed to have a circular wave shape, the tag radiators 103 and 104 have no angled portion, unlike the triangular wave shape shown in FIG. 1, so that the damage to the RFID tire tag can be reduced.

Figure 3:
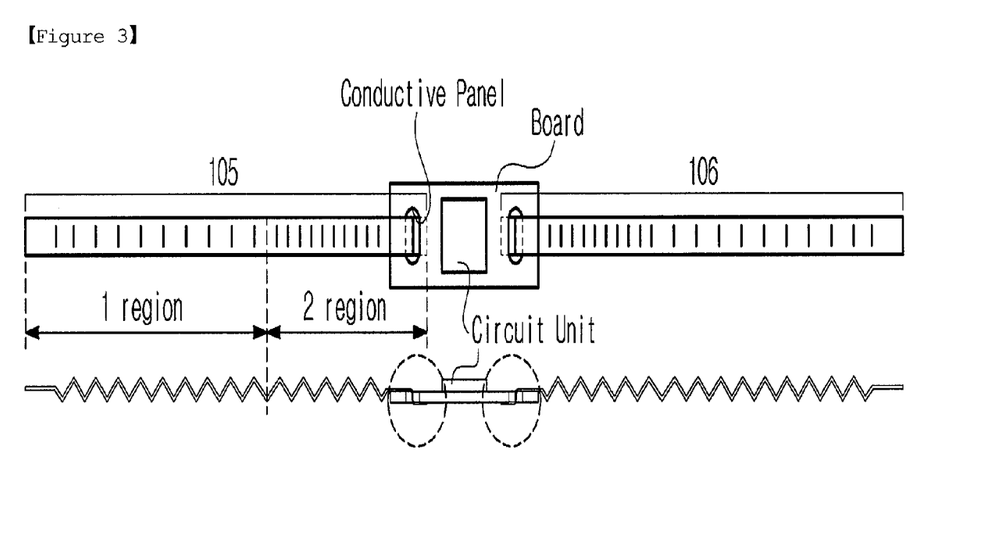
FIGS. 3 and 4 are views showing embodiments of an RFID tire tag, in which there is no the division of each tag radiator into a first region and a second region, and each tag radiator is formed to have a uniform corrugation density.
Figure 4:
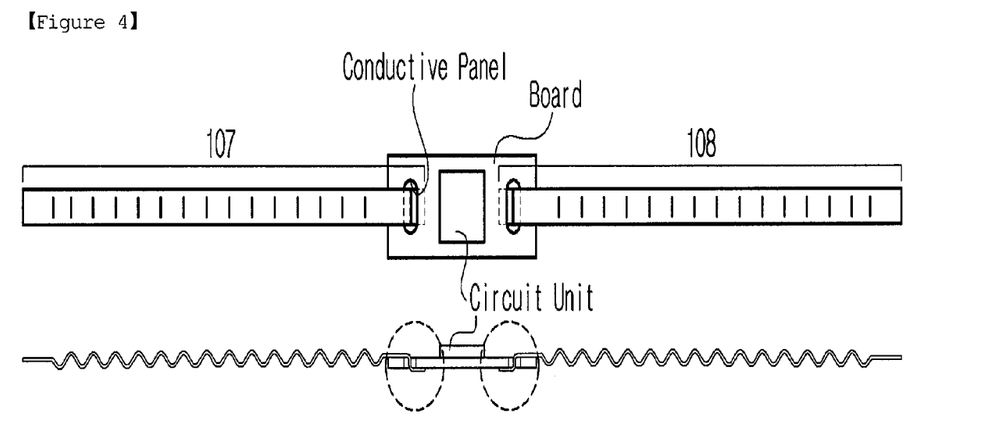

FIGS. 3 and 4 show embodiments of an RFID tire tag according to the present invention.

First, the RFID tire tag of FIG. 3 is similar to that of FIG. 1, described above, but differs from that of FIG. 1 in that there is no division into the first regions and the second regions and in that the corrugation densities of the tag radiators 105 and 106 are uniform and the same Meanwhile, tag radiators 105 and 106, shown in FIG. 3, the ends 105*c* of the triangular wave-shaped tag radiators are inserted into respective holes 105*b*, which are formed in a board 105*a*, and are bent. The ends 105*c* are bent with respect to the board 105*a* and are then coupled to the board 105*a* by soldering, and thus the tag radiators 105 and 106 can be securely fastened to the board 105*a*.

The RFID tire tag of FIG. 4 is implemented by causing the tag radiators 103 and 104, which are shown in FIG. 2, to have the same uniform corrugation density, and has the same feature as that described with reference to FIG. 3. Here, tag radiators 107 and 108 have a circular wave shape.

Figure 5:
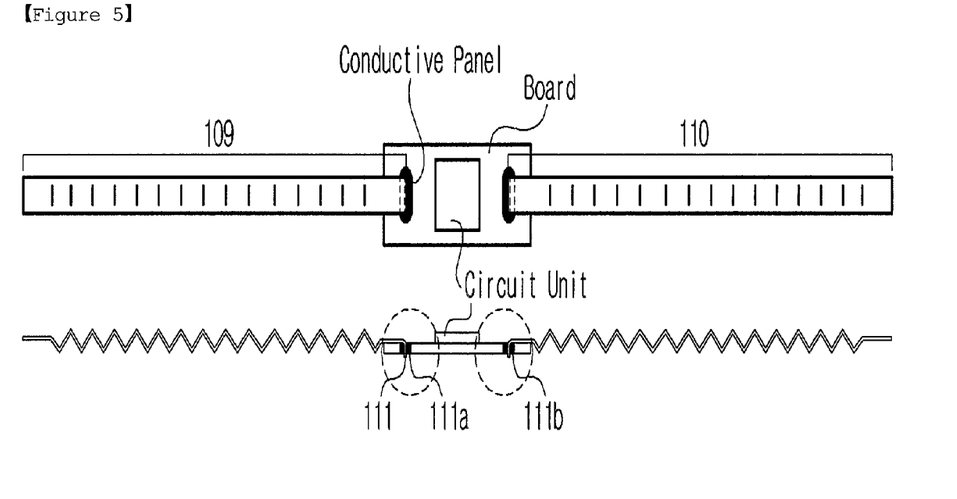
FIG. 5 is a view showing a modification of the embodiment of FIG. 3.
Figure 6:
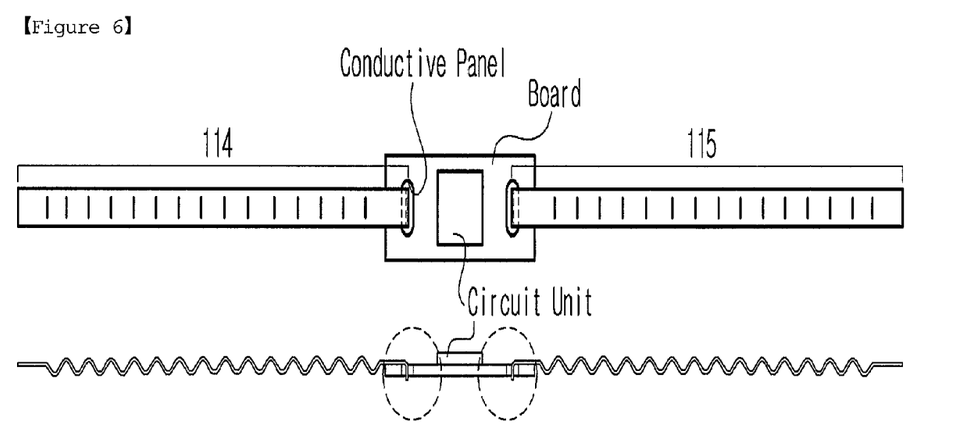
FIG. 6 is a view showing a modification of the embodiment of FIG. 4.

FIG. 5 shows a modification of the embodiment of FIG. 3, and FIG. 6 shows a modification of the embodiment of FIG. 4.

First, the ends (for example, reference numeral 113) of tag radiators 109 and 110, shown in FIG. 5, are vertically inserted into holes 111*a* and 111*b*, which are formed in a board. In this state, the ends (for example, reference numeral 113) of the tag radiators 109 and 110 are coupled to the board by soldering. Although the degree of coupling between the tag radiators 109 and 110 and the board is slightly reduced compared to that of FIG. 4, the above-described coupling is advantageous in that the manufacturing process is simplified. In the same manner, tag radiators 114 and 115, shown in FIG. 6, are even more securely coupled to the board.

Figure 7:
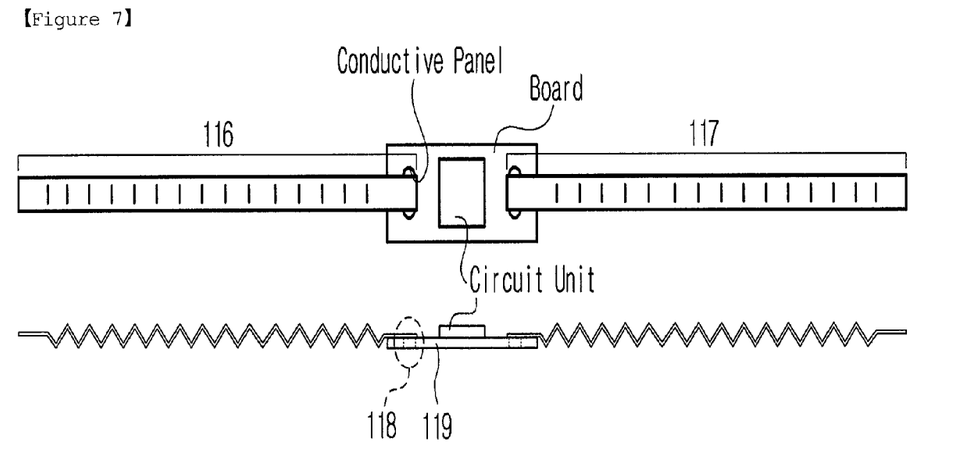
FIG. 7 is a view showing another modification of the embodiment of FIG. 3.
Figure 8:
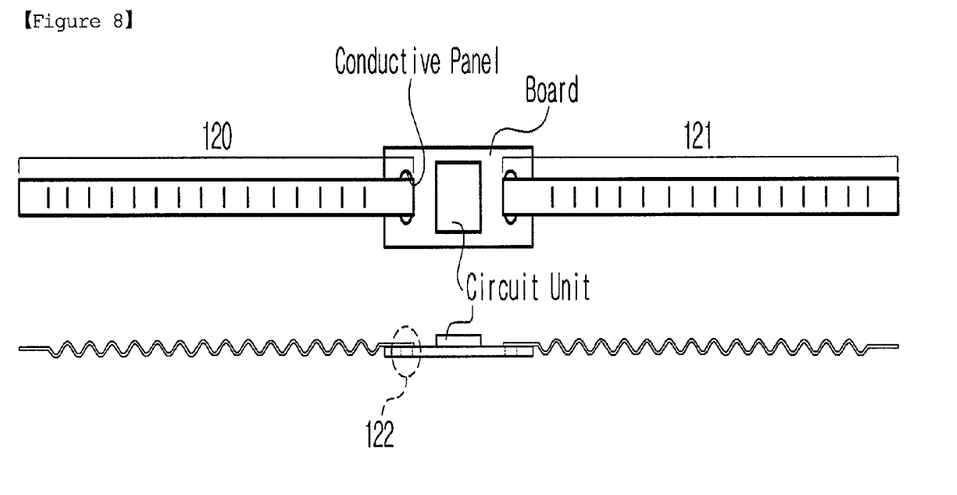
FIG. 8 is a view showing another modification of the embodiment of FIG. 4.

FIG. 7 shows another modification of the embodiment of FIG. 3, and FIG. 8 shows another modification of the embodiment of FIG. 4.

First, FIG. 7 shows that the end 118 of the tag radiator 116 is soldered parallel to a board 119. FIG. 8 shows that the ends (for example, reference numeral 122) of tag radiators 120 and 121, having a circular polarization wave shape, are soldered parallel to a board. In the embodiments, shown in FIGS. 7 and 8, tag radiators 116, 117, 120 and 121 are soldered to the boards without the use of an additional process (for example, bending).

Figure 9:
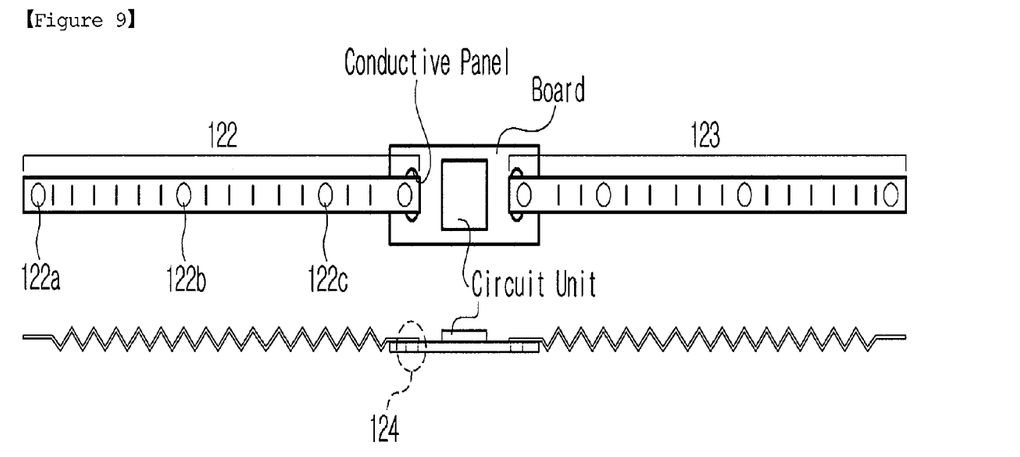
FIG. 9 is a view showing an embodiment of an RFID tire tag, in which holes are formed in each of tag radiators using boards and which are securely coupled to a tire by the holes.

FIG. 9 shows an RFID tire tag according to another embodiment of the present invention.

The RFID tire tag, shown in the drawing, is similar to the embodiment described in conjunction with FIG. 8. Here, holes 122*a*, 122*b* and 122*c* are formed to pass through the surface of a tag radiator, which is formed using a board and is coupled with the tire material, and thus the degree of coupling between the tire and the RFID tire tag can be increased. Before rubber, which is the main material constituting the tire, is completely vulcanized in a vulcanization process, the RFID tire tag according to the present embodiment is inserted into the tire and then the soft rubber, which constitutes the RFID tire tag, is vulcanized after passing through the holes 122*a*, 122*b* and 122*c*. Accordingly, the RFID tire tag cannot be moved in the tire. In the drawing, the ends 124 of respective tag radiators are arranged parallel to a board.

Figure 10:
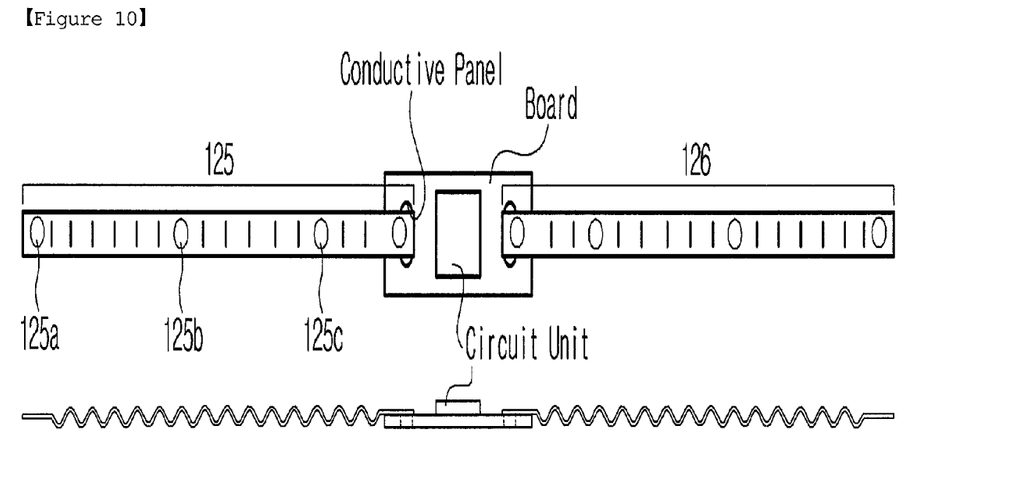
FIG. 10 is a view showing an embodiment of an RFID tire tag, in which the tag radiators of FIG. 9 are implemented to have a circular wave shape.

FIG. 10 shows a modification of the embodiment of FIG. 9.

The RFID tire tag, shown in the drawing, is similar to the RFID tire tag described in conjunction with FIG. 9, but differs from the RFID tire tag of FIG. 9 in that a board has a circular wave shape. Since the embodiment of FIG. 10 is the same as the embodiment of FIG. 9 except that tag radiators 125 and 126 have a circular wave shape, repeated descriptions are omitted.

As described above, the tag radiators of the RFID tire tags described in conjunction with FIGS. 1 to 10 have been described as being formed using boards. Each of the boards has excellent responsiveness even when the external transponder transmits radio waves in the direction of the plane thereof or in the direction of the side surface thereof. Furthermore, when holes are formed in the surface of each board and when each RFID tire tag is coupled with rubber material for a tire using the holes, the RFID tire tag and the tire can be securely coupled to each other. In contrast, when the tag radiators are formed using boards, the pressure-resisting characteristic of the tag radiators using boards may be inferior to that of the tag radiators using wires.

In order to solve this problem, the tag radiators may be formed using wires. This is described with reference to FIGS. 11, 12, 16 and 17.

Figure 11:
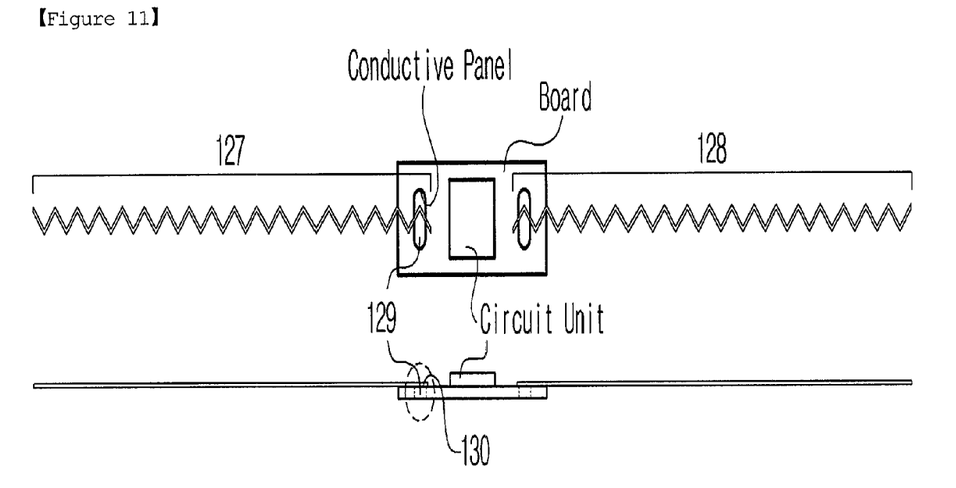
FIG. 11 is a view showing an embodiment of an RFID tire tag, in which tag radiators are formed using wires and are soldered to bonding parts, which are provided on a board.

FIG. 11 shows an embodiment of an RFID tire tag, in which tag radiators 127 and 128 are formed using wires and are soldered to a conductive panel 129, which is provided on a board.

Figure 12:
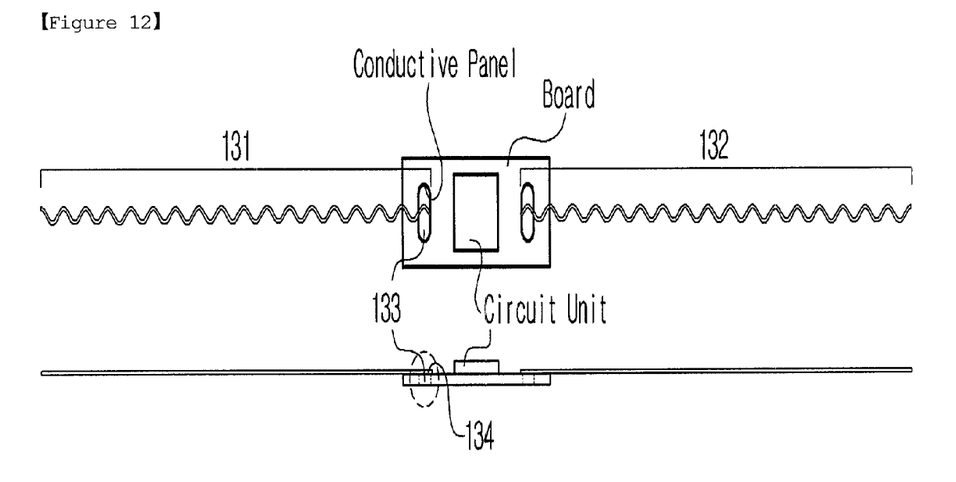
FIG. 12 is a view showing an embodiment of an RFID tire tag, which is similar to the embodiment of FIG. 11 and in which tag radiators formed to have a circular wave shape.

FIG. 12 shows an embodiment of an RFID tire tag, which is similar to the embodiment of FIG. 11 and in which tag radiators 131 and 132 are formed to have a circular wave shape.

Figure 13:
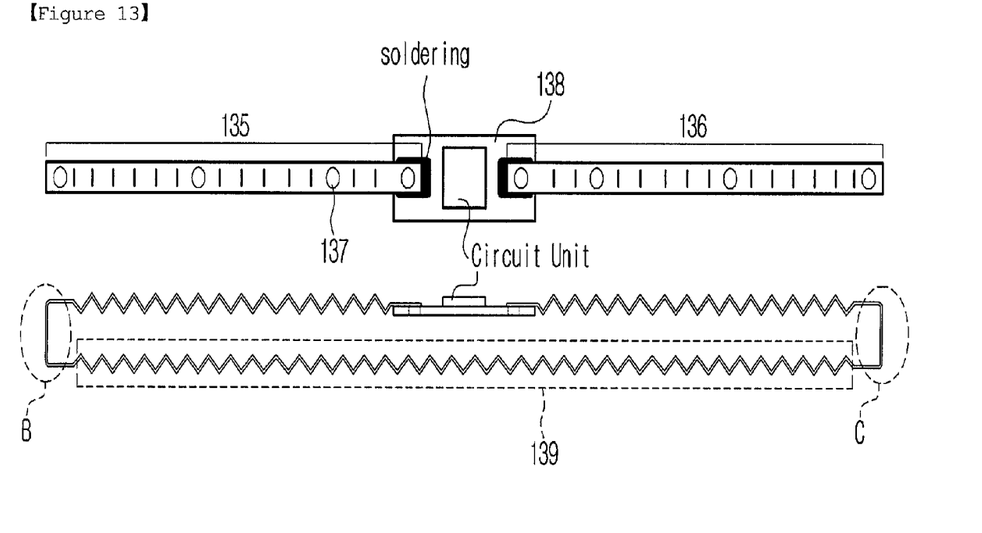
FIG. 13 is a view showing an embodiment of an RFID tire tag, in which the ends of respective tag radiators, which are formed of boards having a triangular wave shape, are connected to form a closed loop.

FIG. 13 shows an embodiment of an RFID tire tag, in which the ends H and I of respective tag radiators 143 and 144, which are formed of boards having a triangular wave shape, are connected to form a closed loop.

Figure 14:
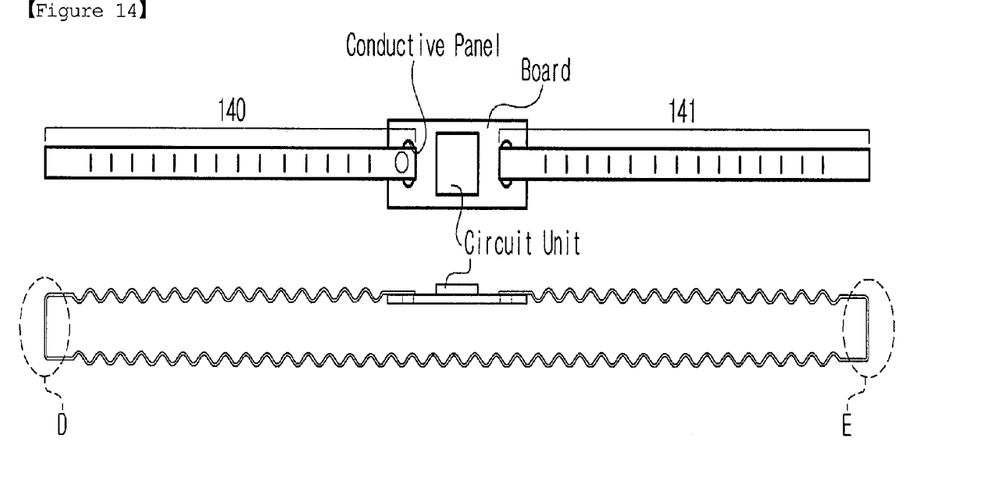
FIG. 14 is a view showing an embodiment of an RFID tire tag, in which the ends of respective tag radiators, which are formed of boards having a circular wave shape, are connected to form a closed loop.

FIG. 14 shows an embodiment of an RFID tire tag, in which the ends J and K of respective tag radiators 145 and 146, which are formed of boards having a circular wave shape, are connected to form a closed loop.

First, in the embodiment, shown in FIG. 11, when tag radiators 127 and a circuit unit are viewed from the side, they have a straight line shape. When the tag radiators 127 and the circuit unit are formed to have the straight line shape, the insertion is made such that the direction of the plane of the circuit unit is parallel to the direction of a plane in which a tire and the road surface come into contact with each other. The ends 130 of the tag radiators 127 are located on a conductive panel 129 and are soldered thereto. Accordingly, the entire RFID tire tag receives uniform pressure from the road surface, and thus the mechanical stability of the RFID tire tag is improved. This is applied to the embodiment of FIG. 12 in the same manner, and is also applied to embodiments, shown in FIGS. 16 and 17, in the same manner. Here, although the tag radiators 127, 128, 131 and 132, shown in FIGS. 11 and 12, are represented as being connected parallel to conductive panels 129 and 133, the tag radiators 127 and the conductive panel 129 may be connected in such a way as to be bent as shown in FIGS. 3 and 6. This application may be applied to all of the other embodiments, as well as the present embodiment, in the same manner. In FIG. 12, the ends 134 of the tag radiators are located parallel to the conductive panel 133, and are coupled to the circuit unit by soldering.

Figure 16:
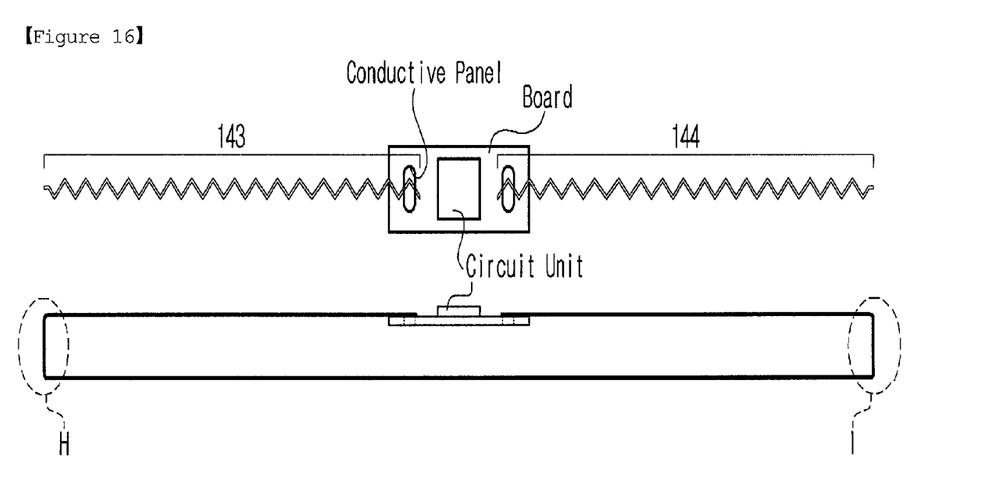
FIGS. 16 and 17 are embodiments of an RFID tire tag, in which the ends of tag radiators are connected to form a closed loop, and thus the ends of the tag radiators are more mechanically secure.

Meanwhile, FIG. 16 is an embodiment of an RFID tire tag, in which the ends H and I of tag radiators 143 and 144 are connected to form a closed loop, and thus the ends of the tag radiators 143 and 144 become further mechanically secure.

Figure 15:
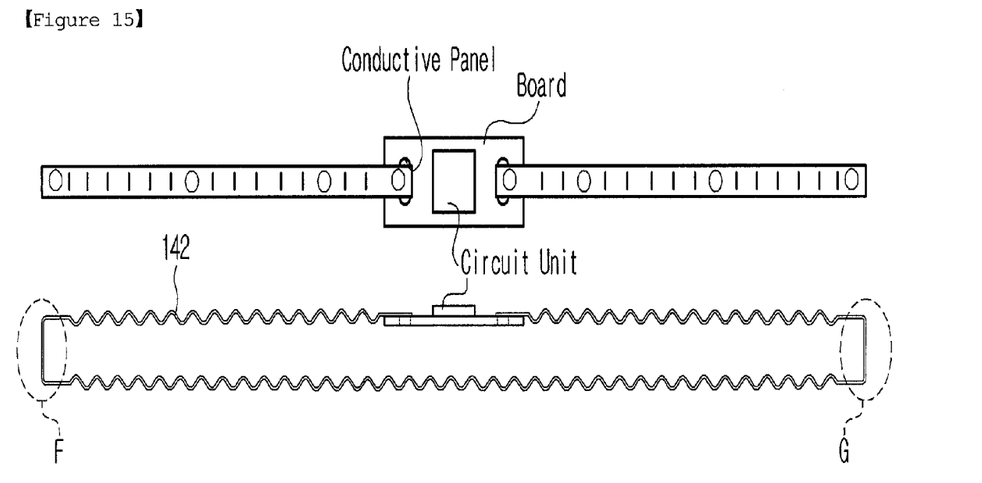
FIG. 15 is a view showing an embodiment of an RFID tire tag, in which the tag radiators of FIG. 17 are bent 90 degrees.
Figure 17:
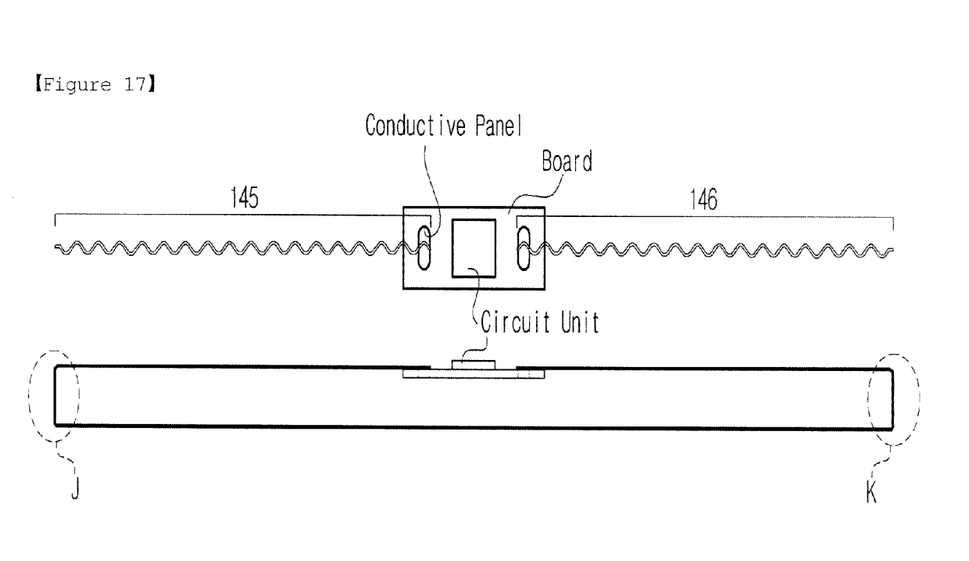

In FIG. 16, the ends H and I of the tag radiators are connected to form a closed loop, thus having a mechanically secure characteristic. In the case where the ends of tag radiators 143 and 144 are formed to have an open loop, the ends of the tag radiators 143 and 144 may be easily damaged by the external force that is applied from a tire when tire is rotated or twisted. However, this can be avoided by coupling the ends of the tag radiators 143 and 144 to each other. Since the embodiment of FIG. 17 is similar to that of FIG. 16 except that the tag radiators 145 and 146 have a circular wave shape, repeated descriptions are omitted. FIGS. 14 and 15 show the cases where the tag radiators, shown in FIGS. 16 and 17, are bent 90 degrees.

Meanwhile, it is preferred that the holes, which are formed in each of the circuit units of FIGS. 1 to 17, be formed in respective ends of each circuit unit. A metal surface is formed around the holes to facilitate soldering.

Figure 18:
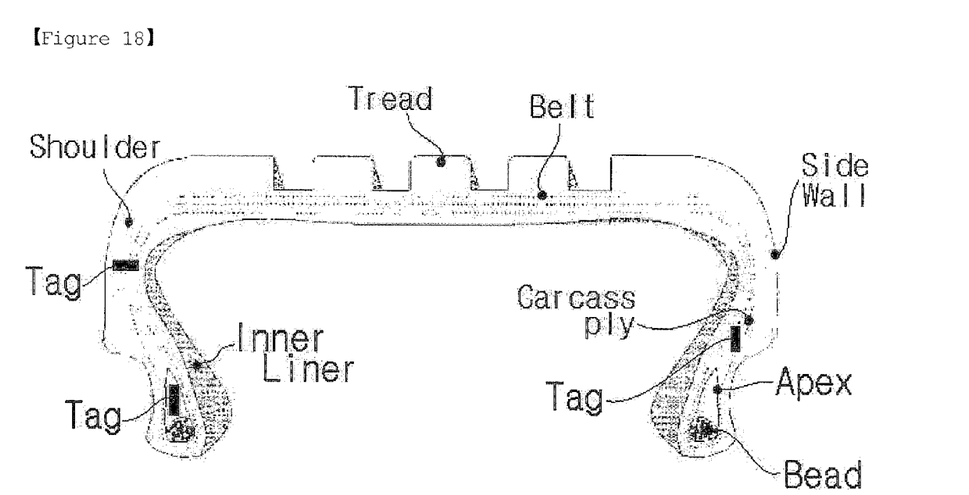
FIG. 18 is a view showing the location of RFID tire tags in tire.

The RFID tire tags described in conjunction with FIGS. 1 to 17 may be mounted in any of the shoulder and apex of the tire, or between the sidewall and inner liner of a tire, the locations of which are shown in FIG. 18.

Although the embodiments of the present invention has been described above with reference to the accompanying drawings, the scope of the present invention must not be interpreted as being defined by the above-described embodiments, and should be determined based on the details described in the claims.

The invention claimed is:

1. A built-in RFID tire tag, comprising:
   an antenna mounted in a tire, and configured to be operated by resonating with radio waves, which are transmitted from an RFID reader and to have a repetitive corrugated shape; and
   a circuit unit configured to be operated by being supplied with power using the radio waves;
   wherein the antenna comprises a pair of tag radiators, which are arranged on a basis of the circuit unit, each of the tag radiators being divided into a first region and a second region,
   a corrugation density of the second regions, which are close to the circuit unit, is greater than that of the first regions, which are not close to the circuit unit, and
   the first regions, which depend on rotational motion of the tire, adapt flexibly to bending and torsion of the tire by a difference between the corrugation densities.

2. The built-in RFID tire tag according to claim 1, wherein each of the tag radiators is any of a triangular wave-shaped leaf spring tag, a triangular wave-shaped wire spring tag, circular wave-shaped leaf spring tag, and a circular wave-shaped wire spring tag.

3. The built-in RFID tire tag according to claim 2, wherein the tag radiators are formed through any of a plate etching process, a press molding process, and an extrusion molding process.

4. The built-in RFID tire tag according to claim 2, wherein the triangular wave-shaped wire spring tag and the circular wave-shaped wire spring tag have a length of less than 60 mm and a wire diameter of 0.1 mm~0.5 mm, and operate in a frequency band of more than 13 MHz.

5. The built-in RFID tire tag according to claim 2, wherein the triangular wave-shaped leaf spring tag and the circular wave-shaped leaf spring tag have a length of less than 60 mm and have a board thickness of 0.1 mm~0.45 mm, and operate in a frequency band of more than 13 MHz.

6. The built-in RFID tire tag according to claim 2, wherein each of the triangular wave-shaped leaf spring tag and the circular wave-shaped leaf spring tag comprises one or more holes, and the holes enable material, which is used to form the tire, to be inserted thereinto and coupled thereto when a forming process or a vulcanization process is performed on the tire.

7. The built-in RFID tire tag according to claim 1, wherein the corrugated shape generates inductive reactance using the corrugation densities, the inductive reactance realizing impedance matching between the antenna and the circuit unit by decreasing capacitive reactance of the circuit unit.

8. The built-in RFID tire tag according to claim 2, wherein the triangular wave-shaped leaf spring tags, the triangular wave-shaped wire spring tags, the circular wave-shaped leaf spring tags, and the circular wave-shaped wire spring tags are configured such that the ends of the respective tag radiators, which are arranged on a basis of the circuit unit, are connected to form a closed loop.

9. The built-in RFID tire tag according to claim 1, wherein:
   the circuit unit comprises insertion holes, which are formed in respective ends of the circuit unit; and
   ends of the second regions are inserted into the respective holes and are bent inwards to be soldered to a rear surface of the circuit unit.

10. The built-in RFID tire tag according to claim 1, wherein the RFID tire tag is mounted in any of a shoulder and apex of the tire, or between a sidewall and inner liner of the tire.

11. The built-in RFID tire tag according to claim 1, wherein the corrugation density of the first regions and the corrugation density of the second regions are identical to each other.

* * * * *